United States Patent
Brooks

[11] Patent Number: 6,014,832
[45] Date of Patent: Jan. 18, 2000

[54] AERATOR AND CHUMMING DEVICE

[76] Inventor: Kenneth E. Brooks, 505 Farr St., Commerce, Mich. 48382

[21] Appl. No.: 08/980,737

[22] Filed: Dec. 1, 1997

[51] Int. Cl.[7] ................................................... A01K 97/02
[52] U.S. Cl. .......................... 43/44.99; 222/401; 239/373
[58] Field of Search ............................. 43/44.99, 57, 55, 43/54.1; 239/373; 222/401, 402

[56] References Cited

U.S. PATENT DOCUMENTS

| | | |
|---|---|---|
| 754,317 | 3/1904 | Kaltenegger . |
| 1,189,932 | 7/1916 | Garber . |
| 1,246,213 | 11/1917 | Zawels . |
| 1,604,971 | 11/1926 | Churchill . |
| 2,663,115 | 12/1953 | McKissack . |
| 3,083,895 | 4/1963 | Welles . |
| 3,640,630 | 2/1972 | Walker ...................................... 401/188 |
| 3,820,272 | 6/1974 | Rowe ............................................ 43/57 |
| 5,154,524 | 10/1992 | Anderson .................................. 401/203 |

*Primary Examiner*—Jack W. Lavinder
*Attorney, Agent, or Firm*—Gifford, Krass, Groh, Sprinkle, Anderson & Citkowski, P.C.

[57] ABSTRACT

An aerator as disclosed for use in combination with a live bait bucket. The aerator includes a tank having an interior chamber with an outlet open to the interior chamber. The tank chamber is pressurized while a tube has one end fluidly connected to the outlet and the other end disposed in the bait bucket to thereby aerate the water contained in the bait bucket. The device is also usable as a chumming device in which an absorbent pad is connected to the free end of the tube. The pad may be either immersed in a fish attractant material or the tank partially filled with fish attractant material such that, with the absorbent pad disposed in the water the fish attractant material is dispersed through the absorbent pad.

7 Claims, 1 Drawing Sheet

AERATOR AND CHUMMING DEVICE

BACKGROUND OF THE INVENTION

1. Field of the Invention

The present invention relates generally to sporting goods and, more particularly, to a bait aerator and chumming device for fishing.

2. Description of the Prior Art

In the sport of fishing, live bait is typically contained within a bait bucket at least partially filled with water. However, over time, the oxygen within the water becomes depleted by the bait so that the bait either becomes very inactive or dies.

One well-known method of attracting fish to the boat has been to throw chum into the water. The chum attracts the fish to the boat where the fish are caught.

The previously known practice of chumming, however, has been limited to large scale fishing operations since relatively large amounts of cut or chopped bait must be dropped into the water to lure the fish. Furthermore, such chumming is both messy and expensive.

SUMMARY OF THE PRESENT INVENTION

The present invention provides a device to overcome all of the above-mentioned disadvantages of the previously known devices.

In brief, the present invention provides an aerator for a bait bucket at least partially filled with water and live bait. The aerator includes a tank having an interior chamber and an outlet open to the interior chamber of the tank.

Means are provided for pressurizing the tank chamber with air. In the preferred embodiment of the invention, the pressurizing means comprises a manually operated pump connected to the tank although other means can optionally be used.

An elongated tube is fluidly connected at one end to the tank outlet and its other end is disposed in the bait bucket. Preferably, a valve is connected in series with the tube so that, with the tank pressurized and the valve open, air flows from the tank, through the tube and to the bait bucket to thereby aerate the water contained in the bait bucket.

Optionally, an absorbent pad may be connected to the free end of the tube and immersed with a fish attractant material. Thus, with the tank pressurized, the air flow through the absorbent pad disperses the fish attractant material into the water.

Optionally, the tank may be partially filled with a fish attractant liquid so that, with the valve open, the fish attractant liquid together with air from the interior of the tank is dispersed out through the tube and absorbent pads into the water. Furthermore, in this latter case, the absorbent pad may optionally be eliminated.

BRIEF DESCRIPTION OF THE DRAWING

A better understanding of the present invention will be had upon reference to the following detailed description when read in conjunction with the accompanying drawing, wherein like reference characters refer to like parts throughout the several views, and in which.

DETAILED DESCRIPTION OF THE PREFERRED EMBODIMENTS OF THE PRESENT INVENTION

Figure 1:
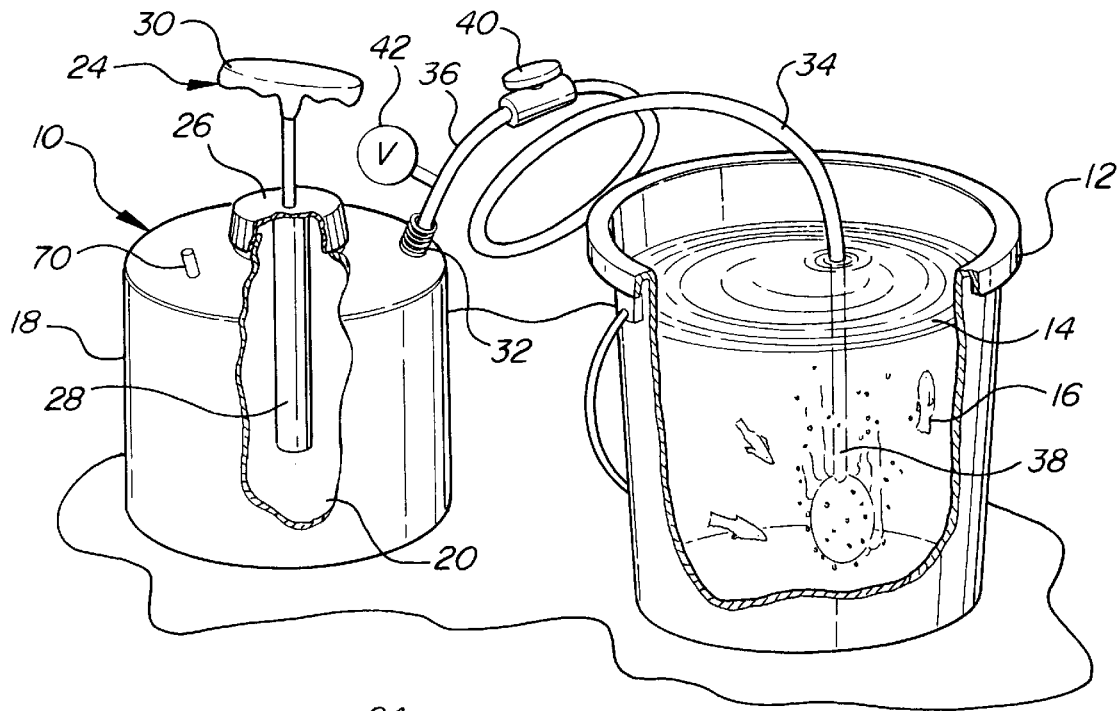
FIG. 1 is an elevational view illustrating a preferred embodiment of the aerator of the present invention.

With reference first to FIG. 1 of the drawing, a preferred embodiment of the aerator 10 of the present invention is there shown for use with a live bait bucket 12. The live bait bucket 12 is at least partially filled with water 14 and contains live bait 16.

Still referring to FIG. 1, the aerator 10 comprises a tank 18 defining an interior chamber 20. The tank 18 preferably has an open top 22 which is externally threaded for a reason to be subsequently described.

An air pump assembly 24 includes a cap 26 which is threadably connected to the tank top 22 and, in doing so, fluidly closes the tank top 22. The pump assembly 24 includes a pump portion 28 positioned within the tank chamber 20 and a manually operated handle 30 positioned exteriorly of the tank 18. Reciprocation of the pump handle 30 inducts air from outside of the tank 18 and then pumps the inducted air into the tank interior 20. In doing so, the pump assembly 24 pressurizes the tank chamber 20.

Still referring to FIG. 1, the tank 18 includes an outlet 32 which is open to the tank chamber 20. An elongated and preferably flexible tube 34 has one end 36 fluidly connected to the outlet 32 and its other end 38 disposed within the bait bucket 12. A valve 40, furthermore, is fluidly connected in series with the tube 34 to control the flow rate of air through the tube 34.

In the preferred embodiment of the invention, a pressure gauge 42 is fluidly connected to the tank interior 20 such that the pressure gauge 42 provides an indication of the air pressure within the tank chamber 20.

In operation, the tank chamber 20 is pressurized by reciprocation of the pump handle 30 in the previously described fashion. Following pressurization and with the tube end 38 positioned in the bait bucket 12, the valve 40 is opened. In doing so, the valve 40 enables air to flow from the tank chamber 20, through the tube 34 and into the bait bucket 12 thus aerating the water 14 in the bait bucket 12 in the desired fashion.

Figure 2:
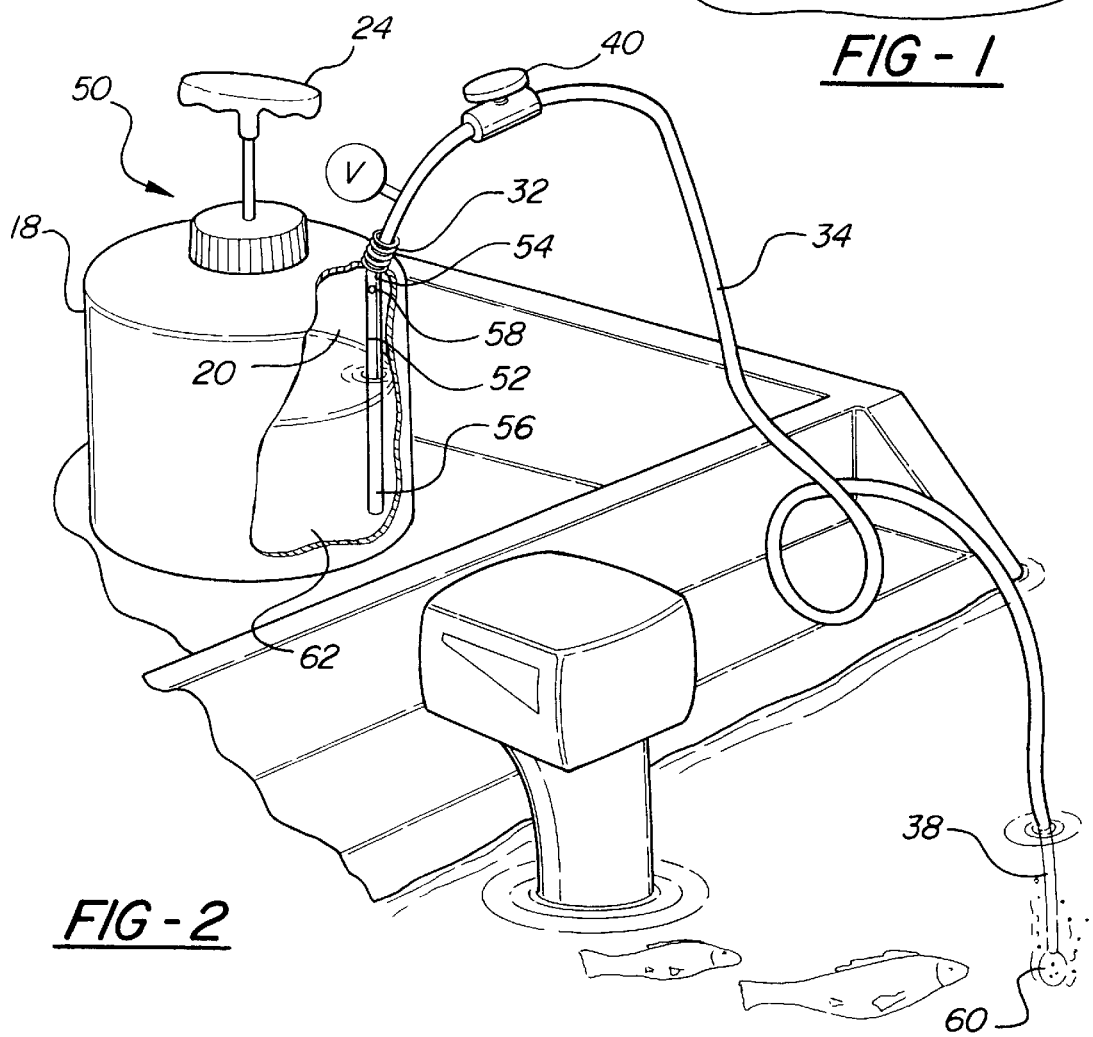
FIG. 2 is an elevational view illustrating a preferred embodiment of the present device used as a chumming device.

With reference now to FIG. 2, a modification to the present invention is there shown in which the device is used as a chumming device 50. The chumming device 50, as before, comprises the tank 18 with its interior chamber 20. The pump assembly 24, furthermore, is utilized to pressurize the tank chamber 20 in the previously described fashion.

Unlike the embodiment of the invention shown in FIG. 1, however, a second tube 52 has an upper end 54 fluidly connected to the tank outlet 32 and a lower end 56 positioned adjacent the bottom of the tank chamber 20. The tube 52 also includes a small opening 58 adjacent its upper end 54 for a reason to be shortly described.

The chumming device 50 can be used in two different ways. In the first way, an absorbent pad 60 is secured to the second end 38 of the tube 34. The pad 60 is immersed in a fish attractant material, such as fish oil, and the tank 18 pressurized in the previously described fashion. Once the valve 40 is opened, air flows through the tube 34 and absorbent pad 60 disperses the fish attractant material into the water adjacent to the boat.

Conversely, in a second mode of operation, a liquid fish attractant material 62 is contained within the tank chamber 20. Following pressurization of the tank chamber 20 and opening of the valve 40, the fish attractant material 62, together with some air introduced through the opening 58 on the second tube 52 is dispersed out through the tube 34 and into the water. The absorbent pad 60 may optionally be secured to the end 38 of the tube 34.

Having described my invention, many modifications thereto will become apparent to those skilled in the art. For example, even though a manually operated pump assembly 24 is used to pressurize the tank 18 in the preferred embodiment of the invention, other means may alternatively be used. For example, the tank 18 could be optionally fitted with air couplings and pressurized from a spare tire of an automotive vehicle or other source of compressed air. In that case, the tank 18 would include an air fill valve 70 (FIG. 1).

I claim:

1. A chumming device comprising:

a tank having an interior chamber and an outlet open to said interior chamber, means for pressurizing said tank chamber, a tube having one end fluidly connected with said outlet, a fish attractant material housed inside said tank chamber, and means for dispersing said fish attractant material and air from the other end of said tube.

2. The invention as defined in claim 1 wherein said dispersing means comprises an absorbent pad attached to the other end of said tube, said absorbent pad being immersed in the fish attractant liquid.

3. The invention as defined in claim 1 and comprising valve means connected in series with said tube.

4. The invention as defined in claim 1 wherein said dispersing means comprises a second tube having one end fluidly connected to said tank outlet and its other end positioned adjacent a bottom of said tank, said second tube being contained in said tank chamber, said second tube having an opening formed through it adjacent said one end, and wherein said tank chamber is at least partially filled with said fish attractant liquid.

5. The invention as defined in claim 1 wherein said tank has an open top, and wherein said pressurizing means comprises an air pump having a cap which closes said tank top such that a portion of said pump is positioned within said tank chamber.

6. The invention as defined in claim 5 wherein said pump comprises a manually operated pump having a pump handle positioned exteriorly of said tank.

7. The invention as defined in claim 1 and comprising a pressure gauge fluidly connected to said tank chamber.

* * * * *